April 16, 1968 J. R. HUMPHRIES, JR 3,378,448
IRRADIATION APPARATUS

Filed March 9, 1966 5 Sheets-Sheet 1

FIG.1

INVENTOR.
JOHN R. HUMPHRIES JR.

BY Anderson, Luedeka, Fitch, Even & Tabin ATTORNEYS

April 16, 1968  J. R. HUMPHRIES, JR  3,378,448
IRRADIATION APPARATUS
Filed March 9, 1966  5 Sheets-Sheet 3

INVENTOR.
JOHN R. HUMPHRIES JR.

BY Anderson, Luedeka, Fitch, Even, & Tabin ATTORNEYS

United States Patent Office 3,378,448
Patented Apr. 16, 1968

3,378,448
IRRADIATION APPARATUS
John R. Humphries, Jr., San Diego, Calif., assignor, by mesne assignments, to Gulf General Atomic Incorporated, San Diego, Calif., a corporation of Delaware
Filed Mar. 9, 1966, Ser. No. 533,042
15 Claims. (Cl. 176—15)

ABSTRACT OF THE DISCLOSURE

A nuclear reactor is described having an annular rack for supporting specimens to be irradiated. The rack surrounds the core and it is movable circumferentially by mechanical drive and is movable axially by flotation tanks which may be selectively filled with liquid or gas. Both the core and the support rack are suspended from a movable bridge and are movable together in the tank with the bridge in order that the core may be positioned adjacent irradiation facilities at each end of the tank.

This invention relates generally to neutronic reactors and, more particularly, to apparatus for irradiating a specimen in a neutronic reactor having a reactive core submerged in a fluid.

Frequently, specimens are placed adjacent the reactive core of a neutronic reactor for experimental irradiation, isotope production, etc. In U.S. Patent No. 3,094,470, assigned to the assignee of the present invention, a neutronic reactor irradiating system is shown and described which provides a novel method and apparatus for simultaneously and uniformly irradiating a plurality of specimens. This is accomplished by providing a specimen rack which rotates about the reactive core of a neutronic reactor. Variations in radiation levels around the core are thereby averaged for each specimen. An access tube is provided for inserting and removing specimens from the specimen rack.

In U.S. Patent No. 3,156,624, also assigned to the assignee of the present invention, a nuclear reactor is shown and described wherein the reactive core is movable to more than one position in a tank of liquid in which it is submerged. The reactive core may be moved to one position in the tank to provide, for example, radiation in an adjoining exposure room, and moved to another position in the tank for permitting entry into the exposure room, for providing radiation of a different energy level or for providing radiation to another exposure room. Among the various advantages of this device are its versatility and the fact that relatively large objects may be irradiated by the reactive core by placing such objects in an exposure room adjoining the tank.

It will be understood by those skilled in the art, from the teaching of the foregoing two patents, that each of the two reactor systems described are capable of performing a number of advantageous functions. Where it is desired to incorporate a rotary specimen rack as taught by U.S. Patent No. 3,094,470 into a neutronic reactor having a movable reactive core as taught by U.S. Patent No. 3,156,624, problems may arise in accomplishing performance of the respective functions without physical interference of the various elements. One such problem is that a specimen rack surrounding the reactive core may prevent positioning of the reactive core sufficiently close to a wall of the tank for providing radiation doses at a desired level in an adjoining exposure room. Furthermore, when the specimen rack surrounds the reactive core, it effects a substantial reduction in the flux density so that objects outside of the specimen rack do not receive as high a radiation level as they would if the specimen rack were not there.

Accordingly, it is an object of this invention to provide apparatus for simultaneously and uniformly irradiating a plurality of specimens by a reactive core, which apparatus is movable to a position which permits other elements to be positioned relatively close to the reactive core. Such other elements, for example, may comprise the wall of a tank separating a liquid coolant-shield in which the core is submerged from a dry exposure room, or may comprise other specimens submerged in the liquid for wet irradiation.

Another object of the invention is to provide improved apparatus for irradiating a specimen in a neutronic reactor having a reactive core submerged in a fluid contained in a tank, and wherein the reactive core is movable with respect to the tank for performing various irradiating functions.

Still another object of the invention is to provide an improved specimen irradiating neutronic reactor.

Other objects and the various advantages of the invention will become apparent from the following description, taken in connection with the accompanying drawings wherein.

The invention is practiced in connection with a neutronic reactor having a reactive core. An annular structure is provided surrounding the core for supporting specimens to be irradiated by neutrons emitted from the reactive core. The annular structure may contain a specimen rack which is circumferentially rotatable to provide uniform irradiations of specimens. The annular structure is axially movable from a first position to a second position relatively displaced from said first position. This permits other elements to be positioned adjacent the reactive core which would otherwise not be possible were the annular structure to remain at said first position.

In the situation where the reactive core is submerged in a liquid filled tank, a floatation device may be connected to the annular structure and may be selectively made buoyant in the liquid in which the reactive core is submerged. The buoyancy of the floatation device provides a lifting force for effecting movement of the annular structure from the first position thereof to the second position thereof. The floatation device may comprise a floatation tank and the tank may be filled selectively with gas to render it buoyant and with liquid in order to cause it to sink. Access tubes from the top of the tank, and rotary drive apparatus (in the case of a circumferentially rotatable specimen rack), are made telescopable to accommodate the movement of the annular structure.

Figure 1:
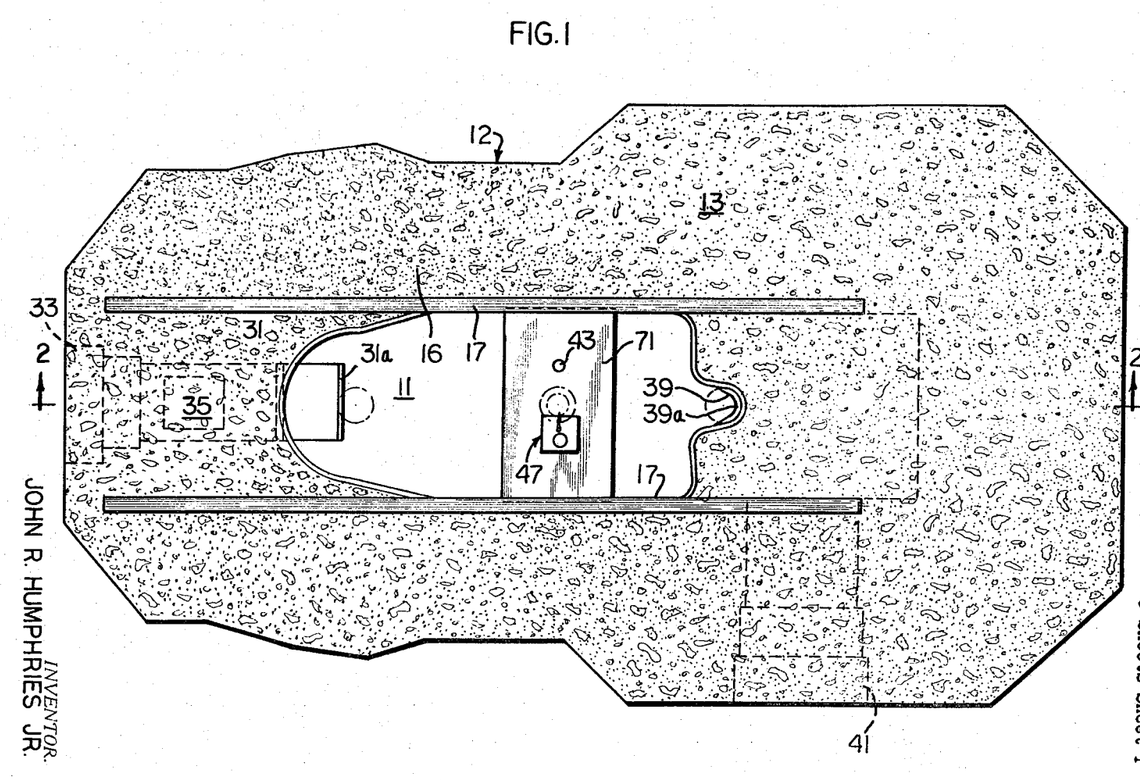
FIGURE 1 is a top plan view illustrating a neutronic reactor incorporating the invention and showing alternative positions of the reactive core in phantom.
Figure 2:
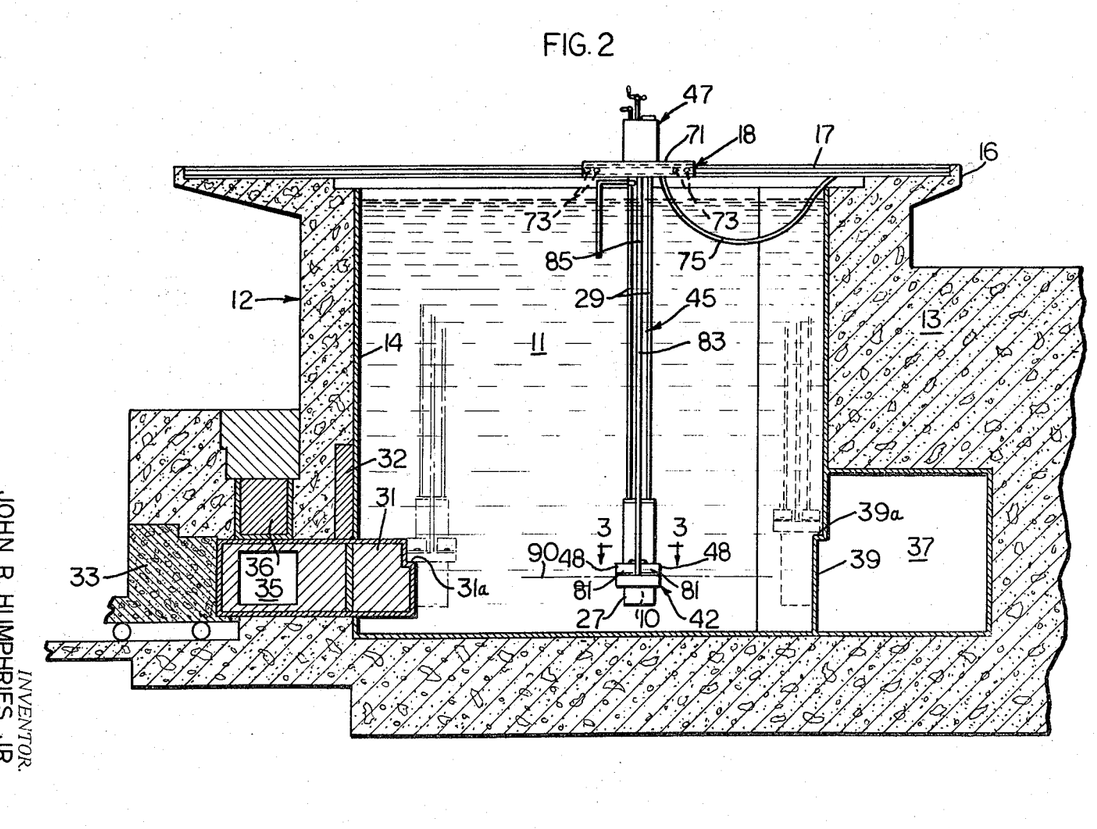
FIGURE 2 is a sectional view of the reactor of FIGURE 1 taken along the line 2—2 therein but with the bridge and reactor core and associated structure remaining unsectioned.

Referring now to FIGURES 1 and 2, a neutronic reactor constructed in accordance with the invention is shown. The reactor provides facilities for various purposes including high energy neutron and gamma radiation studies, large volume radiation effects testing, and sample activation. The reactor includes a reactive core 10, disposed near the bottom of a reactor tank structure 12 defining a tank 11. The reactor tank structure, which is generally elongated in horizontal outline, may be disposed in a correspondingly shaped pit in the ground so that effective shielding against radiation may be afforded without resorting to more expensive above the ground shielding structures. In the illustrated reactor however, the tank structure 12 is designed for above ground location. The tank structure 12 may be constructed by standard construction methods and includes a concrete shield 13 lined with a skin or wall 14 of aluminum. A horizontal shelf 16 is preferably provided at the upper part of the tank structure 12 and supports a track structure 17 upon which a movable reactor bridge 18 travels.

The reactor tank 11 is filled with a suitable liquid which acts as a reflector, moderator, coolant and shield for the reactive core. For these purposes, either ordinary or heavy water is acceptable. Using water as a shield permits one to lower specimens into the reactor tank 11 before irradiation and visually observe the core during reactor operation. The depth of the reactor tank 11 is determined by the amount of shielding desired above the reactive core 10. Normally 16 feet of ordinary water over the core 10 provides an adequate radiation shield.

Figure 3:
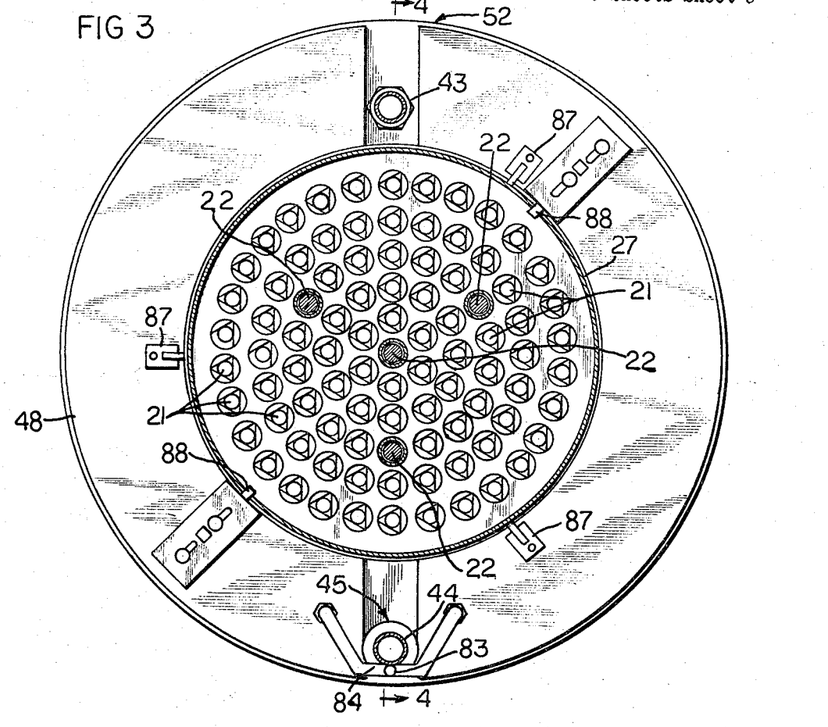
FIGURE 3 is an enlarged sectional view taken along the line 3—3 of FIGURE 2.

The reactive core 10, which may be of any suitable construction, is surrounded by a core shroud 27. In one embodiment, the reactive core consists of a cylindrical lattice of fuel and moderator elements 21, and control rods 22 (see FIGURE 3). A satisfactory core construction for the present reactor is shown and described in detail in the aforementioned U.S. Patent No. 3,156,624. Water surrounds these components and occupies about one-third of the core colume. The fuel and moderator elements have graphite end sections which serve as top and bottom reflector members. The outer regions of the core may contain graphite dummy elements which act as a radial reflector. The water in the tank 11 also acts as a reflector and varies in thickness from infinity (i.e., greater than 6 inches) to a minimum of approximately one inch, depending upon the position of the core in the tank. The core components, including the fuel and moderator elements, the control rods and the dummy reflector elements are contained and supported between top and bottom aluminum grid plates 24 and are surrounded by the cylindrical aluminum shroud 27 which supports the grid plates. The shroud 27 is secured to and supported from the movable bridge 18 by a pair of supporting beams 29 which extend vertically downward from the movable bridge.

Some of the experimental and irradiation facilities associated with the reactor are situated at the ends of the tank structure 12, while others are supported from the bridge 18 for positioning immediately adjacent the reactive core. Physical access and observation of the core are possible at all times through the water shield. At one end of the reactor structure, an aluminum enclosed graphite thermal column 21 projects horizontally through the concrete wall into the tank 11. The projecting end of thermal column 31 is recessed at the top to form a shelf 31a, the purpose of which will be subsequently explained. Horizontal access and shielding for thermal column 31 are provided by a track-mounted motor-driven (not shown) high density concrete door 33. Radial beam ports (not shown), which extend from the core periphery through the water and concrete to the outer face of the tank, may also be provided at the horizontal thermal column end of the tank.

A cavity 35 is provided in the horizontal thermal column 31. The purpose of the cavity, referred to as a "Hohlraum," is to flatten the thermal neutron distribution in this region of the horizontal thermal column. A vertical tube of graphite 36, located above the horizontal thermal column, provides a vertical thermal column. The flux provided by the "Hohlraum" provides relatively uniform neutron radiation for the vertical thermal colunm.

At the opposite end of the reactor structure is an exposure room 37 in which large engineering and biological experiments may be irradiated. Exposure room 37 may be lined with borated concrete and may be of the order of 9 feet high, 10 feet wide, and 12 feet long. A segment 39 of the aluminum pol liner skin 14 projects into the exposure room permitting, with the core positioned in the segment, maximum exposure of radiation into the room and providing 180° access to the core perimeter for experiments. The wall 14 above segment 39 is recessed to form a shelf 39a, for purposes which will be subsequently explained. Access to the exposure room 37 may be by any suitable means such as a track-mounted, motor-driven (not shown) concrete door 41. Electrical power leads and other services used with experimental apparatus can be routed through suitable conduits (not shown) in the shield of room 37. Cooling water pipes (not shown) may also be embedded in the concrete to remove the heat produced by absorbed radiation and thus prevent excessive stresses in the concrete.

The reactor core and shroud are supported by the bridge 18 that spans the reactor tank 12. Mounted on wheels 73, the bridge travels on rails 17 provided at the top edge of the sides of the tank. Thus the reactor core can be moved from one operating position to another. The structural steel framework of the bridge is covered with movable aluminum cover plates 71. The cover plates 71 can support the weight of people and apparatus on the bridge and yet can be raised to permit access to the core.

In one reactor embodiment the bridge is approximately six feet wide and twelve feet long. The bridge is propelled by means of a variable speed electric motor (not shown) that drives gears (not shown) attached to one of wheels 73 on each side of the bridge. The wheels 73 may be of the double flanged type similar to those wheels used on overhead cranes. Power, control circuit wiring, and compressed air are supplied to the bridge through trail cable 75. The cable 75 is attached to the underside of the bridge and has sufficient slack to permit unrestricted movement of the bridge 18.

Facilities are provided for isotope production to permit dry irradiation of specimens and production of isotopes immediately outside of the reactive core 10. The isotope production facility consists primarily of six components: an annular watertight rotary specimen rack assembly 42 which surrounds the core shroud, a specimen access tube 43, a tube and drive shaft assembly 45, a drive and indicator assembly 47 mounted on the reactor bridge 18, a specimen lifting assembly (not shown) which is used for the insertion and removal of specimen containers, and buoyancy chambers 48 for vertical movement of the rotary specimen rack assembly.

Figure 4:
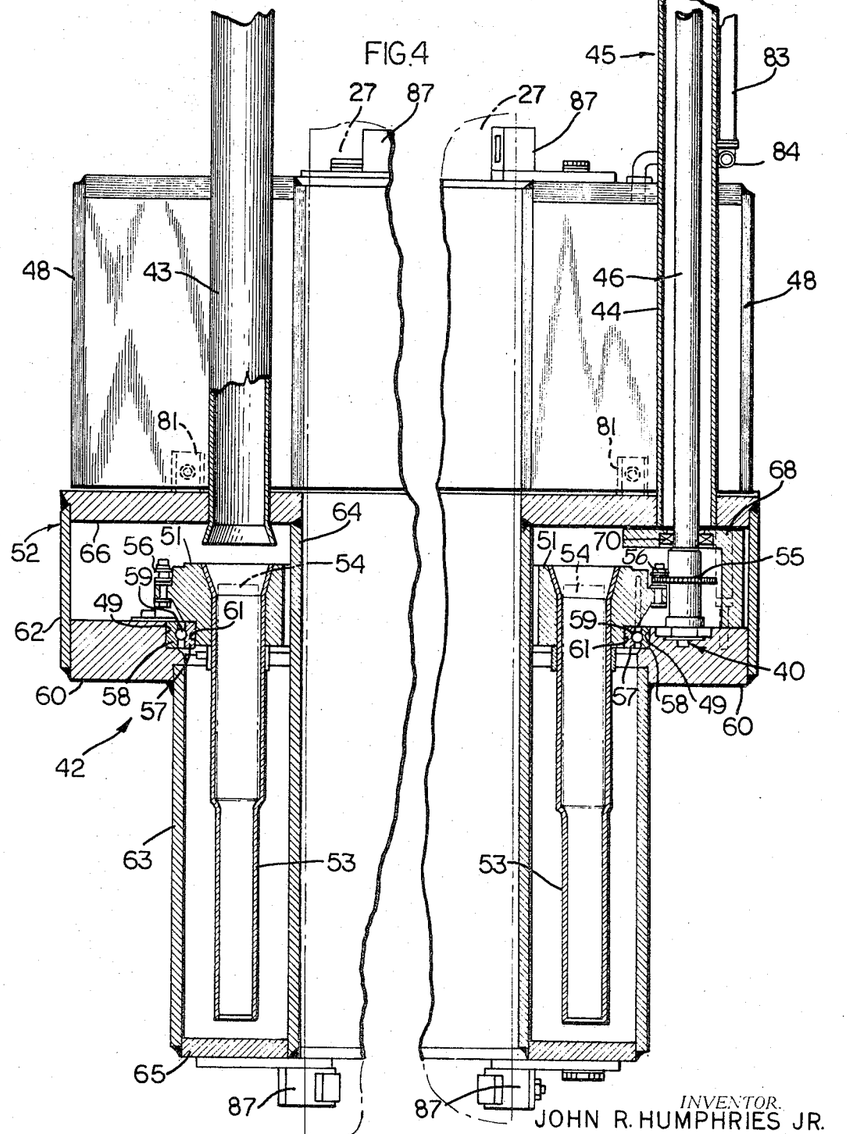
FIGURE 4 is an enlarged sectional view, with the center part broken out, taken along the line 4—4 of FIGURE 3 and with the reactor core and shroud outlined in phantom.

Referring to FIGURE 4, the rotary specimen rack assembly 42 consists of an annular aluminum rack 51 that holds specimens during irradiation, and an outer donut-shaped seal welded aluminum housing 52. The rack 51, which can be rotated inside the housing 52, supports a plurality of evenly spaced aluminum receptacles 53 which are open at the top and closed at the bottom. The receptacles serve to hold specimen containers 54 (shown in phantom). The rack 51 can be rotated manually or electrically through the tube and drive shaft assembly 45, and the circumferential position thereof is controlled from the drive and indicator assembly 47 on bridge 18. Motion is transmitted from the tube and drive shaft assembly 45 to the rotary specimen rack 51 through a stainless steel sprocket 55 and chain drive 56 in the housing 52. The chain extends around the outer periphery of the specimen rack and is fastened at spaced intervals thereto. The tube and drive shaft assembly 45 includes a sealed straight tube 44 that encloses a drive shaft 46 and connects the rotary specimen rack housing 52 with the drive and indicator assembly 47 on the bridge. Since this tube 44 extends upwardly in a straight line from the reactor core, shielding may be provided by inserting a suitable neutron absorbing plastic (not shown) within the tube 44 between the core and the bridge.

The rack 51 and specimen containers are rotatably supported within the housing 52 by a suitable bearing structure. Any bearing structure which allows the rack 51 to be freely rotatable relative to the housing 52 may be used. In the illustrated embodiment, a ball bearing ring structure is used. The ball bearing ring structure includes an inner race 57, an outer race 58, and a plurality of balls 59 rotatably engaged therein. The outer race 58 is fastened securely to a mating recess 49 at the upper inner corner of a ring 60 which forms part of the housing 52. The inner race 57 is fastened to a mating recess 61 within the rack 51. The rack 51 is rotatable from the top of the reactor to continuously move the aluminum receptacles 53 around the reactor core, and also to successively bring each receptacle to a position under the single vertically extending access tube 43.

In the illustrated embodiment, the housing 52 is formed by welding or the like and includes upper and lower tubular outer walls 62 and 63, respectively, a tubular inner wall 64, a right-shaped bottom wall 65, and a ring-shaped top wall 66. The upper and lower outer walls are of different diameters. The upper outer wall, which is of larger diameter, is connected to the lower outer wall by the ring 60 which forms a shoulder in which the lower end of drive shaft 46 is journalled by a suitable thrust bearing arrangement 40.

Access tube 43 extends through an opening in top wall 66 and the drive shaft 46 extends through a further opening in top wall 66. In the illustrated reactor, these openings are diametrically opposite to each other on the housing. The specimen access tube 43 is slightly larger in inner diameter than that of the containers 54 to permit passage of the containers threrethrough. The lower end of the access tube 43 extends into the housing 52 and is attached to the top wall 66 thereof. A bearing plate 68 for supporting the drive shaft extends across and is fastened to the inside of the housing 52 at the lower end of the tube 44. The bearing plate 68 contains a vertically supported bushing 70 for the drive shaft 46.

A fishing pole type apparatus (not shown) may be used as the specimen lifting assembly for inserting or removing specimen containers into and out of the rotary specimen rack. A pole enables the operator to keep isotopes at a safe distance and provides maximum flexibility during handling. An electric cable attached to a reel (not shown) on the pole may serve as a hoisting cable for the specimen container and a power conductor for actuating a specimen pickup tool (not shown). This pickup tool may be a small solenoid operated scissors-like device that fits into the upper end of the specimen container. The pickup solenoid may be actuated from a button on the fishing pole.

Figure 5:
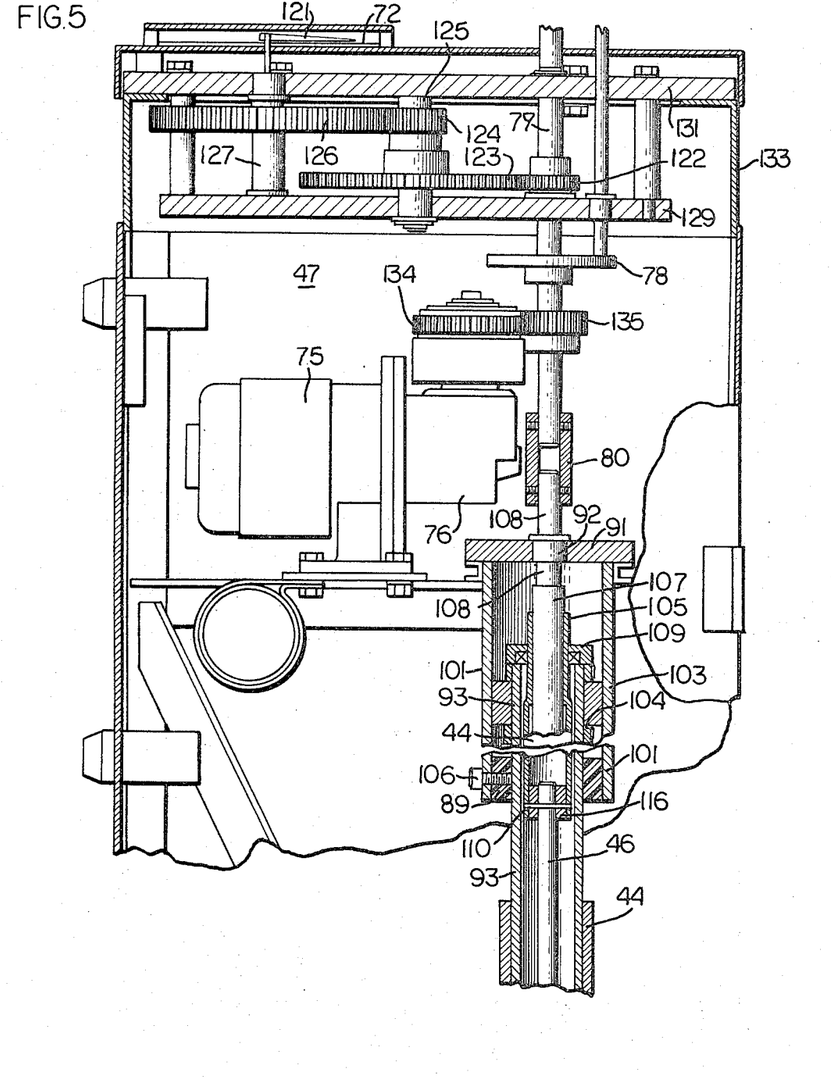
FIGURE 5 is an elevational view, partially in section, illustrating apparatus mounted on the bridge of the reactor of FIGURES 1 and 2.
Figure 6:
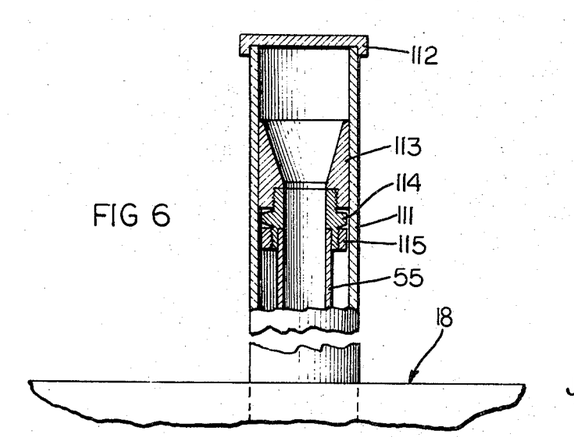
FIGURE 6 is an elevational view, partially in section, of further apparatus on said bridge.

The drive and indicator assembly 47 is located on the reactor bridge 18. Referring particularly to FIGURE 5, this assembly includes an indicator dial 72 with a division for each tube 53 in rack 51, a hand crank shaft 79 to which is attached a hand crank (not shown) for manual rotation of the specimen rack 51, a motor 75 and slip clutch 76 for electric operation, and a handle (not shown) operated locking shaft 77. To rotate the rotary specimen rack 51 inside its housing 52, the locking shaft 77 is lifted out of a positioning hole in a plate 78 (attached to crank shaft 79) and the crank shaft 79 (coupled to the upper segment 108 of drive shaft 46 by coupling joint 80) is rotated either by the hand crank or through the motor and slip clutch drive. When the indicator pointer 121 is properly positioned at the desired specimen rack position, the locking shaft 77 can be lowered into a corresponding positioning hole in plate 78. This locks the gear train in the drive box on the bridge for loading or unloading specimens. After the rack 51 is loaded, the locking shaft 77 is raised and the rack can be rotated electrically to provide uniform exposure of specimens.

To indicate the position of the specimen rack 51, the upper segment 108 of drive shaft 46 is connected through a gear train to the indicating pointer 121. The gear train includes a pinion gear 122 attached to the crank shaft 79, a pair of idler gears 123 and 124 which are attached to an idler shaft 125, and a spur gear 126 attached to an indicator shaft 127 on which the pointer 121 is mounted. The idler shaft 125 and the indicator shaft 127 are journalled in suitable bearings (not shown) located in the bearing plates 129 and 131. The indicating pointer 121 is arranged to move across the indicator dial 72 as the drive shaft 46 rotates the specimen rack. The indicator dial 72 is suitably calibrated so as to indicate the positions of the specimen rack where the tubes 53 are in alignment with the access tube 43. A housing 133, which is suitably supported on the bridge 18, is provided for supporting the bearing plate 131 and for enclosing the bearing plates and the gear train. The bearing plate 129 is suspended from the bearing plate 131.

The electrical motor 75 is suitably mounted within the housing 133, and this motor drives a gear 134 on the crank shaft 79 through a gear 135 and the slip clutch 76. Slip clutch 76 permits rotation of gear 135 when the hand crank is used. An off-on switch control (not shown), located on the exterior surface of the housing 133, may be provided for the motor. Once the desired number of samples are placed in the tubes 53, which are individually indexed with respect to the access tube 43 through manual rotation of the specimen rack by operation of the hand crank, the motor 75 can be operated to thereby provide continuous rotation of the samples about the reactor core at a selected, uniform rate of speed. This rotation of the samples is of considerable advantage in effecting uniform irradiation of the samples, since the samples are thereby exposed equally to all sides of the reactor core.

If desired, a suitable clutch mechanism (not shown) may be interposed between the hand crank and shaft 79 to selectively disengage the hand crank and prevent its rotation during motor operation of the drive shaft. A rotary specimen rack assembly, tube and drive shaft assembly, drive and indicator assembly and specimen access tube, all similar to those just described, are illustrated and described in detail in the previously cited U.S. Patent No. 3,094,470. Accordingly, many of the details of these mechanisms are not dealt with extensively herein.

The reactor core 10, being supported from the movable reactor bridge 18, may be moved into the projecting segment 39 in liner 14 to permit exposure of specimens in the room 37. With the reactor in this position, a nominal clearance of about one-half inch is maintained between the core shroud 27 and the inside surface of the segment 39 so as to provide the core with about a one-inch water reflector. (There is also about one-half inch of water between the fuel elements and the shroud.) The tank water provides sufficient shielding for personnel to work in the exposure room when the core is operating at the thermal column end of the pool. Boron is used in the inner portion of the concrete walls of the exposure room to capture neutrons and thus minimize the activation of the concrete.

It will be seen from FIGURE 2 that when the reactive core is positioned at either of the ends of the tank 11, adjacent either the exposure room 37 or the horizontal thermal column 31, it is important that the specimen rack assembly 42 be raised above shelves 31a or 39a. By doing so, the assembly 42 is accommodated by the recess in wall 14 above shelves 39a or 31a, and the shroud may be placed next to the wall 14 to permit the side wall of the core 10 to be placed close to the irradiation facilities. The vertical location of the active center of the core is indicated in FIGURE 2 by the line 90. It may also be desirable to raise the specimen rack assembly away from the active center of the reactive core when the core is in other positions in the pool to provide desired flux densities for irradiating objects placed in the tank water adjacent core 10.

In order to accomplish the raising of the specimen rack assembly, two aluminum tanks defining buoyancy chambers 48 are fastened to the top of the rotary specimen rack housing by brackets 81 and serve to control the vertical movement of the facility. Tanks or chambers 48 are each arcuate in form and are spaced from each other on either side of the access tube 43 and the tube and drive shaft assembly 45. The chambers are seal welded to be closed on the tops and sides, but are open on the bottoms and spaced from the top of the housing 52. A compressed air source (not shown) on the bridge 18 supplies compressed air to the chambers 48 through a flexible line 83 which runs along the side of the tube and drive shaft assembly 45 and is secured by suitable brackets (not shown) to tube 44. The lower end of line 83 is attached to a T-joint 84 which connects with the chambers 48. A venting tube 85 (see FIGURE 2), which is in fluid communication with compressed air tube 83 near the top thereof through a control valve 86, extends downwardly into the tank 11. When compressed air is forced through the flexible line 83 and valve 86 is closed, water in chambers 48 is displaced outwardly through spaces between the lower edge of the chambers and the top of the rotary specimen rack assembly 42 to provide an upward buoyant force on the assembly. The chambers are of a size to provide a lifting force of approximately 50 pounds more than the combined weight of the chambers and rotary specimen rack assembly in water. When the valve 86 is opened between the flexible line 83 and the venting tube 85, the pressure of the water will force air out of chambers 48 and fill the chambers with water. The weight of the metal elements provides a sinking force of approximately 50 pounds.

A plurality of graphite shoes 87 (see FIGURES 3 and 4), some of which are mounted on the chambers 48 and some of which are mounted on the lower end of the rotary specimen rack housing 42, ride against the outside of the core shroud 27 to aid in aligning the irradiating facility with respect to the core shroud. In addition, a pair of guides 88, mounted on chambers 48, extend into vertical guide slots in shroud 27. The vertical slots terminate at their lower ends in a position where the specimen rack is supported by guides 88 at level 90, i.e., adjacent the active center of core 10. The upper ends of the vertical guide slots in shroud 27 are closed and serve to limit the upward travel of the specimen rack assembly at a suitable point.

When the core is to be moved into segment 39, the specimen rack assembly 42 is first raised to the limit of its upward travel by blowing out chambers 48. The core is then moved into position with the recess above shelf 39a permitting the core to be moved close to the wall 14. Similarly, when the core is to be moved next to the thermal column 31, the specimen rack assembly is raised and the core moved into position with the recess above shelf 31a permitting the core to be moved next to the aluminum skin of the thermal column. If it is desired to irradiate specimens with the core next to thermal column 31, the assembly may be lowered by flooding chambers 48 until the housing 51 sinks and rests on the ledge 31a. Here, the flux will be strong enough to provide satisfactory radiation facilities.

In order to permit vertical movement of the floatation chambers 48 and the rotary specimen rack assembly 42, it is necessary that the effective length of the specimen access tube 43 and the tube and drive shaft assembly 45, between the bridge and the rotary specimen rack assembly, be made variable. To this end, the specimen access tube 43 and the tube and drive shaft assembly 45 are both made telescopable to accommodate the vertical movement of the rotary specimen rack assembly. The upper terminus of tube and drive shaft assembly 45 at the bridge 18 includes an upper plate 91 and a bushing 92 in a central opening in plate 91 permits the upper segment 108 of the drive shaft 46 to extend upwardly into the drive and indicator assembly housing 133.

Just below plate 91, the drive shaft 46 and tube 44 are provided with a telescoping assembly 95. Telescoping assembly 95 comprises a sleeve 101 welded to plate 91 and extending downwardly therefrom. Tube 44 terminates below assembly 95 and is provided with a slightly smaller diameter extension 93 welded thereto. Extension 93 is coaxially positioned and aligned in sleeve 101 by spaced bushings 89 and 103. Bushing 103 is held between two rings 102 secured to tube 44 by set screws 104. Bushing 103 permits tube 44 to move axially with respect to sleeve 101. The lower bushing 89 is secured to sleeve 101 by a screw 106 and also permits the tube 44 to slide therethrough. Thus, tube 44 and its extension 93 are able to telescope within sleeve 101. The material and fit of bushings 89 and 103 are selected to minimize friction with tubes 93 and 101.

A sleeve 105 is provided with a lower portion of relatively larger diameter which is drivingly secured to the drive shaft 46 by a pin 110 and spacer bushing 116. The upper portion of sleeve 105 has a square interior cross section and slidably mates with a cross sectionally square coupling section 107 secured to upper segment 108 of the drive shaft 46. Square section 107 slides axially in sleeve 105 and is drivingly connected with the sleeve because of the nature of its non-circular cross section. Accordingly, while axial movement of section 107 with respect to sleeve 105 is permitted, rotary movement of the two elements with respect to each other is prevented. Drive shaft 46 therefore provides, through sleeve 105, coupling section 107, and upper segment 108, continuous transmittal of torque throughout its length despite the fact that its length varies. The top part 108 of extension 107 is coupled to crank shaft 79. The bearing 109 journals sleeve 105 in the extension 93 of tube 44 for rotation therein with drive shaft 46.

Thus, as rotary specimen rack assembly 50 moves upwardly from its position surrounding the active center of the reactor core 10 (at level 90) to a position displaced therefrom, the lower ends of tube 44 and shaft 46 will move upwardly. Extension 93 and sleeve 101, and coupling section 107 and sleeve 105, telescope to permit such motion. The reverse occurs when the specimen rack assembly moves downwardly from its displaced position to its operative position. It should be noted that in FIGURES 2 and 4, the specimen rack assembly 42 is shown in its lowest position, whereas FIGURE 5 illustrates the telescoping assembly 95 as it appears when the assembly 42 is raised to its upper limit.

Similarly, the specimen access tube 43 is also made able to telescope. A sleeve 111, mounted in a vertical position on bridge 18, has a cap 112 at the upper end thereof. The upper end of specimen access tube 55 extends into sleeve 111 and has a bushing portion 113 mounted thereon by a fitting 114 and lock nut 115. Bushing portion 113 permits tube 55 to slide axially in a sleeve 111 as the rotary specimen rack assembly moves in its vertical path between a position adjacent the active center of the reactor core 10 to a position displaced therefrom.

Loading and unloading of the isotope production facility can be accomplished while the reactor is operating in any position in the tank. Since the isotope production facility is raised about three feet above the core center line at the exposure room operating position, exposure of specimens in that position would be impractical because of the reduced flux. The isotope production facility is also raised slightly when the reactor is moved into the beamport and thermal column position. However, since the isotope production facility is raised only slightly, sufficient flux is available here to merit operation of the facility. Highest flux operation is possible only when the specimens can be centered at the reactor's center line 90, i.e., when the isotope production facility is in its lowest position, as shown in solid lines in FIGURE 1.

From the foregoing discussion, it will be seen that the invention provides an improved nuclear reactor system which includes improved apparatus for irradiating a specimen or a plurality of specimens. The apparatus is simple of operation and low in cost and permits irradiation of a plurality of specimens by means of a movable specimen supporting rack which may be moved axially with respect to the core. Such movement may be effected by means of floatation tanks, the buoyancy of which may be selectively controlled.

Various other modifications and embodiments of the invention will be apparent, from the foregoing description, to those skilled in the art, and such modifications and embodiments are intended to fall within the scope of the appendant claims.

What is claimed is:

1. Apparatus for irradiating a plurality of specimens in a neutronic reactor having a reactive core, including in combination, an annular specimen supporting rack surrounding the core, means for rotating said rack circumferentially about the core, means for axially moving said rack with respect to the core from a first position adjacent the active center of the reactive core to a second position displaced from said first position, and means for positioning other irradiation elements adjacent the active center of the reactive core with said rack in said second position.

2. Apparatus in accordance with claim 1 wherein said means for rotating said rack comprise a rotary shaft substantially parallel with the axis of said rack, and wherein said rotary shaft is telescopable to accommodate axial movement of said rack.

3. Apparatus in accordance with claim 1 wherein a tube is provided extending generally parallel with the axis of said rack for placing specimens in and removing specimens from said rack, and wherein said tube is telescopable to accommodate axial movement of said rack.

4. Apparatus in accordance with claim 1 wherein the core is submerged in a liquid and wherein said means for axially moving said rack comprise a floatation tank selectively fillable with gas and with liquid.

5. Apparatus for irradiating a specimen in a neutronic reactor having a reactive core submerged in a liquid, including in combination, means for supporting the specimen, said supporting means being movable between first and second positions, one of which is disposed relatively adjacent the active center of the reactive core and the other of which is disposed relatively displaced from the active center of the reactive core, said second position being above said first position, floatation means connected to said supporting means and control means for selectively rendering said floatation means buoyant to provide a lifting force for effecting movement of said supporting means from the first position thereof to the second position thereof.

6. Apparatus in accordance with claim 5 wherein said floatation means comprise a floatation tank connected to said supporting means, and wherein said control means comprise means for filling said floatation tank selectively with gas and with liquid to effect movement of said supporting means between the first and second positions thereof.

7. Apparatus in accordance with claim 5, wherein the reactive core is enclosed in a cylindrical shroud submerged in the liquid, and wherein said means for supporting the specimen comprise an annular structure adapted to surround the shroud for movement axially with respect thereto.

8. Apparatus in accordance with claim 7, wherein said annular structure comprises an annular specimen rack surrounding the shroud, and further comprises an annular housing enclosing said specimen rack.

9. Apparatus in accordance with claim 7, wherein the liquid in which the shroud is submerged is contained in a tank having a recess in the wall thereof, and wherein the shroud is supported in fixed relation to a movable bridge structure which is disposed above the tank, said second position of said annular structure being adjacent the recess in the tank such as to permit said movable bridge structure to position said shroud immediately adjacent the walls of the tank, whereby the active center of the reactive core may be positioned close to irradiation facilities outside the tank.

10. Apparatus for irradiating a specimen in a neutronic reactor having a reactive core enclosed in a cylindrical shroud submerged in a liquid-filled tank and supported in a fixed position with respect to a bridge at the top of the tank, said apparatus including in combination, an annular rack for supporting a plurality of spaced apart specimens to be irradiated about the periphery of the cylindrical shroud adjacent the active center of the reactive core, an annular housing enclosing and supporting said specimen rack, said specimen rack being circumferentially movable with respect to said housing around said shroud, a drive shaft extending from said specimen rack to the bridge, means for rotating said drive shaft for circumferentially moving said specimen rack around said shroud, a floatation tank connected to said housing, and means for filling said floatation tank selectively with gas and with liquid to effect movement of said annular housing and said specimen rack supported thereby axially with respect to the shroud between a first position wherein said housing is adjacent the active center of the reactive core to a second position wherein said housing is displaced from the active center of the reactive core for permitting other elements to be positioned adjacent the active center of the reactive core, said drive shaft having telescopable portions to vary the effective length of said drive shaft in accordance with the axial movement of said housing and specimen rack to correspond with variation in the distance between the bridge and said housing and specimen rack.

11. Apparatus in accordance with claim 10 wherein said telescopable portions on said drive shaft comprise a first substantially solid portion having a non-circular cross section and a second hollow portion slidably receiving said substantially solid portion and in mating engagement with the periphery thereof.

12. Apparatus in accordance with claim 10 wherein an access tube connects said housing to the bridge to provide access to said housing for placing specimens in and removing specimens from said specimen rack, said access tube having telescopable portions to vary the effective length of said access tube with the axial movement of said housing and said specimen rack to correspond with variation in the distance between the bridge and said housing and specimen rack.

13. Apparatus in accordance with claim 10 wherein an elongated tube encloses said drive shaft, said elongated tube having telescopable portions to vary the effective length of said elongated tube as the length of said drive shaft varies.

14. Apparatus in accordance with claim 5 wherein said supporting means are of annular configuration and surround the reactive core, and wherein means are provided for rotating said supporting means circumferentially about the core.

15. Apparatus in accordance with claim 1 wherein said positioning means comprises a bridge supporting the core and said rack and said moving means, said bridge being movable to selectively position the active center of the core adjacent at least one other specimen-containing element.

(References on following page)

References Cited

UNITED STATES PATENTS

| | | | | |
|---|---|---|---|---|
| 3,006,834 | 10/1961 | Loeb | | 176—15 |
| 3,042,601 | 7/1962 | Loeb | | 176—15 |
| 3,094,470 | 6/1963 | Stone et al. | | 176—15 |
| 3,156,624 | 11/1964 | Clifford et al. | | 176—12 |

FOREIGN PATENTS 965,887  8/1964  Great Britain.

CARL D. QUARFORTH, *Primary Examiner.*

L. DEWAYNE RUTLEDGE, *Examiner.*

H. E. BEHREND, *Assistant Examiner.*